(12) United States Patent
McKelvy et al.

(10) Patent No.: US 11,449,839 B2
(45) Date of Patent: Sep. 20, 2022

(54) SYSTEMS AND METHODS FOR EQUIPMENT MAINTENANCE

(71) Applicant: UpKeep Technologies Inc. LLC, Los Angeles, CA (US)

(72) Inventors: Mark Isaac McKelvy, Los Angeles, CA (US); Ryan Junee Chan, Los Angeles, CA (US); Ismail Ahmed Elshareef, Los Angeles, CA (US)

( * ) Notice: Subject to any disclaimer, the term of this patent is extended or adjusted under 35 U.S.C. 154(b) by 0 days.

(21) Appl. No.: 17/186,189

(22) Filed: Feb. 26, 2021

(65) Prior Publication Data

US 2021/0264385 A1   Aug. 26, 2021

Related U.S. Application Data

(60) Provisional application No. 62/982,005, filed on Feb. 26, 2020.

(51) Int. Cl.
*G06Q 10/00* (2012.01)
*G06K 9/62* (2022.01)
*G06N 20/00* (2019.01)

(52) U.S. Cl.
CPC .......... *G06Q 10/20* (2013.01); *G06K 9/6256* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2010/0127881 A1* | 5/2010 | Schechter | G06F 11/0709 340/584 |
| 2018/0128713 A1* | 5/2018 | Kriss | F24F 8/10 |
| 2018/0270310 A1* | 9/2018 | Venkatesan | H04L 65/102 |

* cited by examiner

*Primary Examiner* — Adam D Tissot
*Assistant Examiner* — Garrett F Evans
(74) *Attorney, Agent, or Firm* — Cognition IP, P.C.; Edward Steakley

(57) ABSTRACT

Disclosed are systems and methods for an industry-wide and predictive approach to maintenance of commercial equipment. In one embodiment, multiple instances of a frontend infrastructure can be deployed to various sites where one or more physical parameters of industrial equipment are monitored with wireless sensors and routed to a backend infrastructure. The backend infrastructure can process the sensor data received from the multiple sites and generate predictive maintenance notifications.

20 Claims, 6 Drawing Sheets

SYSTEMS AND METHODS FOR EQUIPMENT MAINTENANCE

CROSS-REFERENCE TO RELATED APPLICATIONS

This application is a U.S. Provisional Application No. 62/982,005 filed on Feb. 26, 2020, the contents of which is incorporated herein by reference in its entirety specification.

BACKGROUND

Field

This invention relates generally to the field of commercial or industrial equipment maintenance, and more particularly to systems and techniques to provide industry-wide, predictive maintenance.

Description of the Related Art

Existing methods of providing diagnostics and maintenance for industrial and commercial equipment rely largely on human technicians and on onboard diagnostics that tend to treat each equipment in isolation. Often a technician tradesman's knowledge and experience of an equipment can be limited to the geographical area his company operates in and/or the customers his company services. While the advent of internet and online forums have contributed to sharing repair knowledge among human operators and technicians, there has not been a holistic approach to diagnostics and maintenance that can impart industry-wide benefits in terms of improving the efficiency of equipment and better maintenance of equipment.

Furthermore, existing technology in the area of equipment failure diagnostics and maintenance can be reactive rather than proactive. For example, sometimes the conditions and circumstances of an equipment failure are not well documented and shared. Therefore, operators of the equipment can be unaware of potential equipment failure. Important industries can suffer economic harm when existing diagnostics or maintenance techniques cannot be reliably applied to determine equipment failure before they occur. Consequently, there is a need for improved diagnostics and maintenance systems and techniques, which can provide a holistic view of equipment in an industry and furthermore provide predictive maintenance functionality.

SUMMARY

In one aspect a method is disclosed. The method includes: receiving a profile of an equipment from an operator of the equipment, wherein the profile comprises one or more physical parameters of the equipment to be monitored and normal ranges of the physical parameters; monitoring, with one or more sensors, the one or more physical parameters of the equipment; transmitting the physical parameter values to a backend server; determining if the physical parameter values are outside the normal range and generating a notification; determining one or more patterns in the physical parameter values over a period of time; and generating a notification if the one or more patterns are indicative of an anomaly in operation of the equipment.

In some embodiments, the one or more patterns indicative of an anomaly comprise the one or more parameter values approaching a range outside the normal range over a period of time, but not exceeding the normal range over the period of time.

In another embodiment, the one or more patterns indicative of an anomaly are determined via one or more machine learning algorithms based on monitored parameter values of a plurality of equipment over a period of time.

In one embodiment, the method further includes: detecting one or more equipment-wide patterns indicative of anomaly in operation, the one or more equipment-wide patterns shared among a plurality of same or similar equipment; generating a notification for some or all of the same or similar equipment.

In some embodiments, the method further includes: generating a set of conditions based at least partly on the one or more patterns, wherein the set of conditions correlate with the anomaly; generating an equipment repair profile corresponding to the anomaly, along with a mapping of the equipment to the equipment repair profile; detecting the presence of the set of conditions in a second equipment; transmitting the equipment repair profile to an operator of the second equipment.

In one embodiment, the method further includes transmitting the equipment repair profile to other operators having equipment same or similar to the second equipment.

In another embodiment, the method further includes: generating equipment repair profiles of a plurality of equipment, corresponding to anomalies detected based on the one or more patterns in the physical parameters; based at least partly on the equipment repair profiles, detecting a set of conditions shared amongst the plurality of equipment having the detected anomalies; generating a second repair profile corresponding to the set of conditions and the detected anomalies corresponding to the set of conditions; detecting presence of the set of conditions in a second plurality of equipment; and transmitting the second repair profile to one or more operators of the second plurality of equipment.

In some embodiments, the set of conditions comprise one or more of; a brand of the equipment, or part identification of a previously repaired or replaced part, and a duration of time after which the part needed repair or replacement.

In another embodiment, the physical parameters comprise one or more of temperature, vibration, electrical current and power drawn.

In one embodiment, the method further includes: transmitting a sensor configuration signal from the backend server to the one or more sensors, wherein the sensor configuration signal is at least partly based on the equipment profile.

In another aspect, a non-transitory computer storage is disclosed. The non-transitory computer storage stores executable program instructions that, when executed by one or more computing devices, configure the one or more computing devices to perform operations including: receiving a profile of an equipment from an operator of the equipment, wherein the profile comprises one or more physical parameters of the equipment to be monitored and normal ranges of the physical parameters; monitoring, with one or more sensors, the one or more physical parameters of the equipment; transmitting the physical parameter values to a backend server; determining if the physical parameter values are outside the normal range and generating a notification; determining one or more patterns in the physical parameter values over a period of time; and generating a notification if the one or more patterns are indicative of an anomaly in operation of the equipment.

In one embodiment, the one or more patterns indicative of an anomaly comprise the one or more parameter values approaching a range outside the normal range over a period of time, but not exceeding the normal range over the period of time.

In some embodiments, wherein the one or more patterns indicative of an anomaly are determined via one or more machine learning algorithms based on monitored parameter values of a plurality of equipment over a period of time.

In one embodiment, the operations further includes: detecting one or more equipment-wide patterns indicative of anomaly in operation, the one or more equipment-wide patterns shared among a plurality of same or similar equipment; generating a notification for some or all of the same or similar equipment.

In some embodiments, the operations further include: generating a set of conditions based at least partly on the one or more patterns, wherein the set of conditions correlate with the anomaly; generating an equipment repair profile corresponding to the anomaly, along with a mapping of the equipment to the equipment repair profile; detecting the presence of the set of conditions in a second equipment; and transmitting the equipment repair profile to an operator of the second equipment.

In one embodiment, the operations further includes: transmitting the equipment repair profile to other operators having equipment same or similar to the second equipment.

In another embodiment, the operations further include: generating equipment repair profiles of a plurality of equipment, corresponding to anomalies detected based on the one or more patterns in the physical parameters; based at least partly on the equipment repair profiles, detecting a set of conditions shared amongst the plurality of equipment having the detected anomalies; generating a second repair profile corresponding to the set of conditions and the detected anomalies corresponding to the set of conditions; detecting presence of the set of conditions in a second plurality of equipment; and transmitting the second repair profile to one or more operators of the second plurality of equipment.

In some embodiments, the set of conditions comprise one or more of a brand of the equipment, or part identification of a previously repaired or replaced part, and a duration of time after which the part needed repair or replacement.

In one embodiment, the physical parameters comprise one or more of temperature, vibration, electrical current and power drawn.

In some embodiments, the operations further include: transmitting a sensor configuration signal from the backend server to the one or more sensors, wherein the sensor configuration signal is at least partly based on the equipment profile.

BRIEF DESCRIPTION OF THE DRAWINGS

These drawings and the associated description herein are provided to illustrate specific embodiments of the invention and are not intended to be limiting.

DETAILED DESCRIPTION

Figure 1:
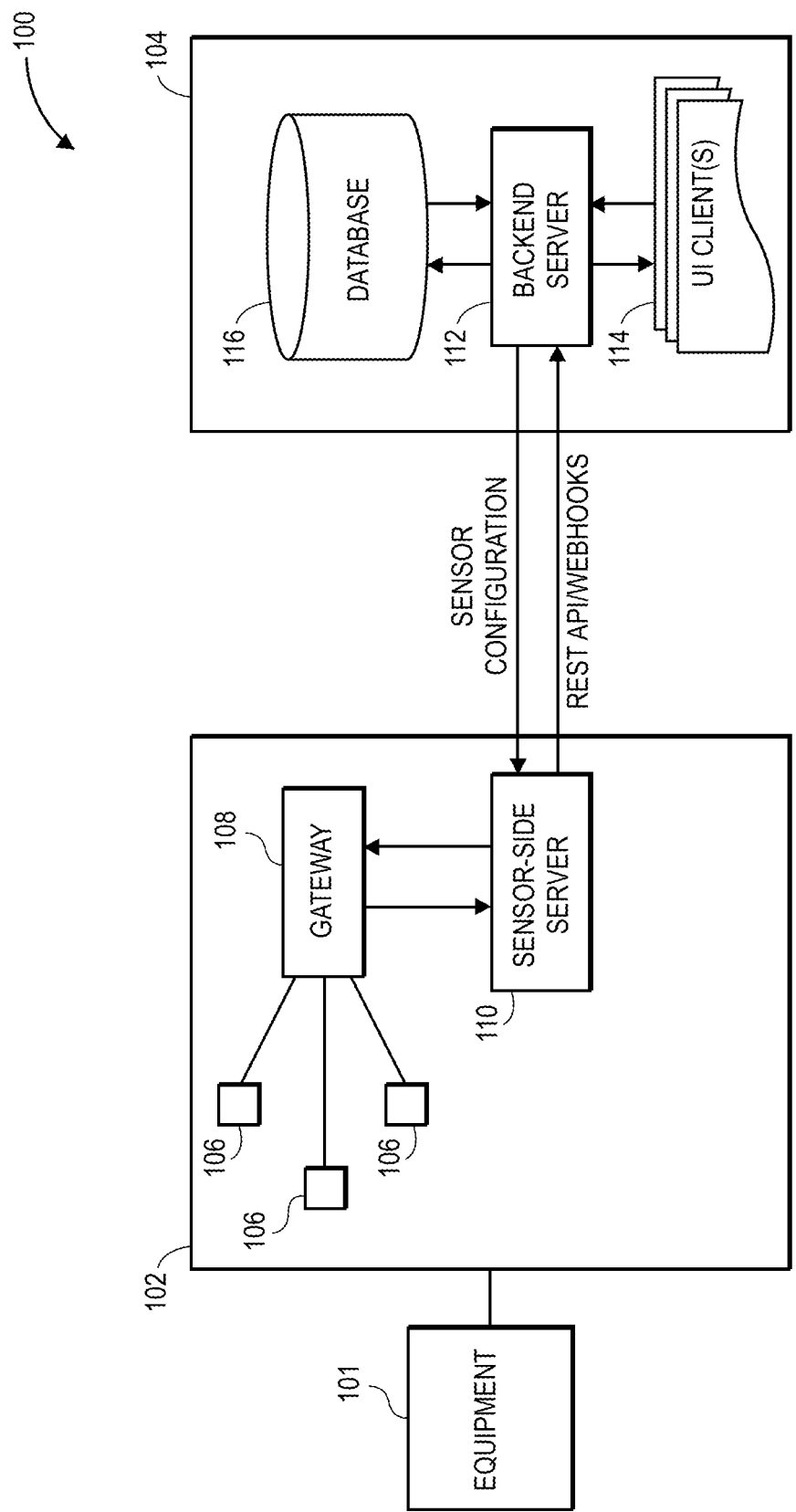
FIG. 1 illustrates a maintenance system according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Industrial and commercial equipment are important parts of the economy. Often this equipment relies on periodic inspection by human technicians to detect and perform maintenance and/or repairs. Sometimes, such equipment can include or are retrofitted with onboard diagnostic tools to assist human technicians in diagnostics, maintenance or repair. In many cases, however, important maintenance or repair may be delayed, postponed or not performed until an equipment failure disrupts the normal operation of the equipment. Additionally, equipment maintenance is generally performed for devices in isolation and technological insights which can be gained from individual repairs and extrapolated across same or similar equipment in an industry are routinely lost.

In some cases, human technicians can accumulate and transfer their knowledge of a particular brand of equipment and device and extrapolate from that knowledge to better perform repair or maintenance on other or similar devices. For example, the technician may be aware of a common failure in a particular brand of industrial refrigerator from his prior repair experiences. However, such knowledge can be limited and not shared among the industry at large. Furthermore, there is no infrastructure to collect and learn from prior repair or maintenance work of a device or industrial equipment, in a manner that the data can inform industry approaches to repair, maintenance and improving efficiency. Such data can provide technological solutions for predictive maintenance actions that can vastly improve the life cycle of industrial, commercial or consumer products by triggering timely and targeted maintenance or repair.

Sensors can be used to monitor critical device parameters and report anomalies to repair or maintenance technicians. However, sensors and sensor data in the context of diagnostics and maintenance are used in isolation. The described embodiments provide infrastructure and methods of operation of diagnostics and maintenance systems, where sensor readings are used both individually and collectively across an industry to provide improved diagnostics and maintenance.

FIG. 1 illustrates a maintenance system 100 according to an embodiment. System 100 can include frontend infrastructure 102 and backend infrastructure 104. Multiple instances of the frontend infrastructure 102 can be deployed at various sites, where the system 100 can provide automated or augmented diagnostics and maintenance for one or more equipment 101. In one embodiment, the frontend infrastructure 102 can be implemented with products provided by Monnit of Salt Lake City, Utah (801-561-5555). Example Monnit products that can be used in frontend infrastructure 102 can include sensors, gateways, sensor-side servers, and software applications that provide operations for these components. The frontend infrastructure 102 can include one or more sensors 106 of measuring various maintenance and/or diagnostics parameters, gateway 108, sensor-side server 110, and application software that provide input/output for the frontend infrastructure 102, as well as general software management of the hardware of the frontend infrastructure 102. In some embodiments, the gateway 108 and/or the sensor-side 110 may be optional and their functionality can be integrated in the sensors 106, or in one or more integrated server/gateway component, where the sensors 106, and/or the integrated server/gateway components provide the raw sensor data of the frontend infrastructure 102 to the backend infrastructure 104.

Sensors 106 can include a variety of sensors, which can measure various diagnostics and/or maintenance parameters, depending on the application and the industry in which the system 100 is deployed. For example, the frontend infrastructure 102 can be deployed in food industry applications, where sensors 106 can be temperature sensors for equipment 101 (e.g., refrigerators). Several industries can also be interested in and might operate equipment that maintain a preferred temperature in a controlled environment. Besides refrigerators in the food industry, storage industry, heating, ventilation and air conditioning (HVAC) industry have an interest in their equipment maintaining a desirable range of temperatures. Persons of ordinary skill in the art can envision other industries within which the system 100 can be used.

Sensors 106 can also be current and/or power sensors in, for example, manufacturing applications, where amount of drawn current and/or power consumption of manufacturing equipment is of interest both for maintenance purposes and for improving efficiency. When infrastructure 102 is deployed for those applications, the sensors 106 can be current and/or power sensors, measuring parameters and parameter values that directly or indirectly indicate current drawn and/or power consumption. As an example, lack of drawn current from the equipment 101 can indicate that the equipment 101 has gone offline, potentially due to a part failure, jam incident or other reasons and the system 100 can generate a notification to order maintenance for the equipment 101. In other applications, sensors 106 can include vibration sensors that can measure vibration in equipment 101, where increased vibration can be indicative of an upcoming need for maintenance.

Sensors 106 can have wired or wireless communication with other parts of the system 100. For example, the sensors 106 can wirelessly communicate their sensor reading to the gateway 108. Similarly, the gateway 108 can communicate via wired or wireless communication protocol with the sensor-side server 110. In one embodiment, the sensors use radio frequency (RF) signals to communicate sensor readings to the gateway 108 and the gateway 108 can communicate via TCP/IP protocol with the sensor-side server 110. Other wired or wireless communication protocols between components of the system 100 can also be implemented.

The sensors 106 can include an identifier system, such as a barcode, a quick response (QR) code. The identifier system, such as a barcode or QR code can be scanned at the time of deploying the sensors 106 via a scanner device in wireless or wired communication with the sensor-side sever 110 or directly with the backend server 112. The backend server 112 can receive the sensor identifier and associate the sensor 106 with the equipment 101 for which the sensor 106 is deployed.

The sensor-side server 110 can route the sensor readings to a backend server 112 in the backend infrastructure 104. Sensor data received from the frontend infrastructure 102 can be in a format that is not decipherable or useful for an operator of the equipment 101. The system 100 can generate the UI client 114 and feed it with processed data in a format that is useful for an operator of the equipment 101 to improve its diagnostic and maintenance functions. Raw frontend infrastructure data from sensors 106 can be received at the backend infrastructure 104 in a variety of formats, including, for example, as JavaScript Object Notation (JSON) files. The backend server 112 can store raw frontend data and/or processed data in a database 116. In one embodiment, the database 116 can be implemented via Postgres SQL. The UI client 114 can be generated in a variety formats, for example, as a website application interface, desktop application interface, mobile computing device interface (e.g., generated as a display on a screen of a laptop, tablet, watch, or special-purpose field computers designed and optimized for seamless interfacing with the backend server 112).

Data received from the frontend infrastructure 102 can also include superfluous details or data that have less value and relevance in terms of maintenance and improved efficiency of the equipment 101. The backend server 112 can detect and eliminate superfluous data and retain sensor readings that have applicability to maintenance and improved operation of the equipment 101. Example superfluous data that might exist in the output of the frontend infrastructure 102 can include extra characters, encoding data, third-party application and graphing data, device identifiers unrelated to the equipment 101 and only internal to the specific operations of the third-party applications running the components of the frontend infrastructure 102.

In other instances, the sensor data received from the frontend infrastructure 102 may need conversion to other formats to present a more meaningful maintenance profile of the equipment 101 to its operator on the UI client 114. For example, some implementations of the frontend infrastructure 102 provide temperature readings in Celsius. For U.S. operators of equipment 101, the backend server 112 can convert the temperature readings from Celsius to Fahrenheit.

Figure 2:
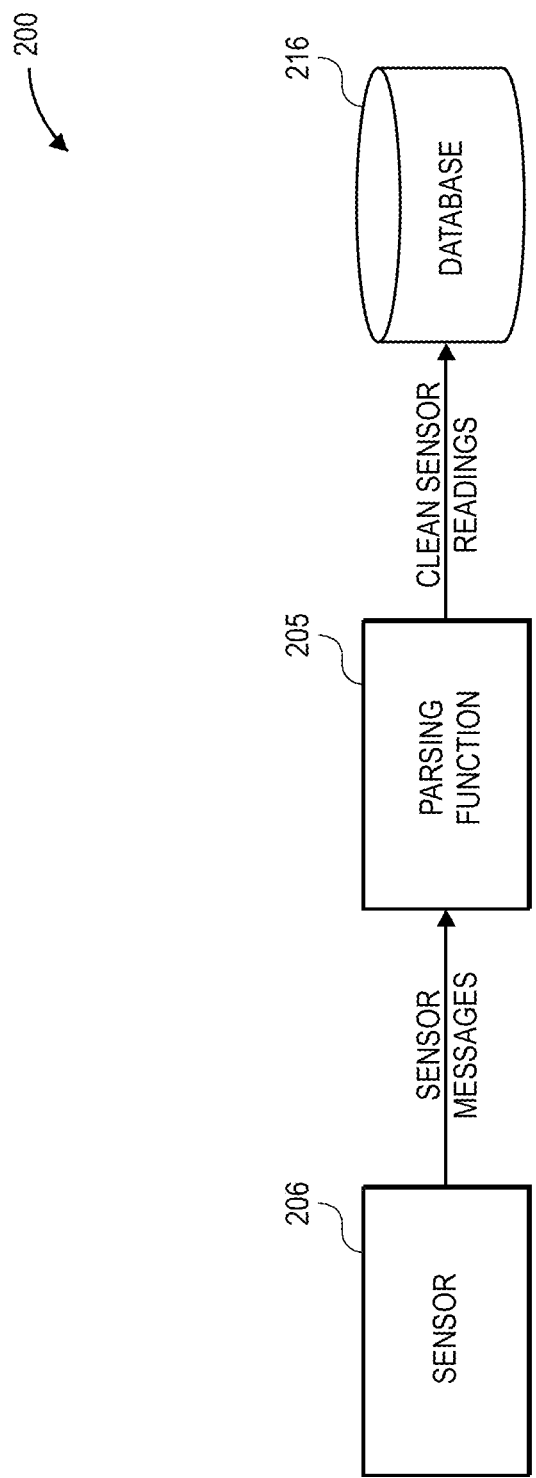
FIG. 2 illustrates a system for converting raw sensor data to a format more useful for consumption by a human operator of an equipment maintained by the embodiment of FIG. 1.

FIG. 2 illustrates a system 200 for converting raw sensor data to a format more useful for consumption by a human operator of the equipment 101. Sensors 206 are similar in design and implementation to sensors 106, as described above. Their sensor messages can come in a variety of formats, which may include superfluous data. A parsing module 205, implemented, for example, in the backend server 112, can scan the sensor messages and remove superfluous data. The clean sensor data can be stored in a database 216. The database 216 is similar in design and operation to the database 116, described above. In some implementations, the type and identification of superfluous data can be pre-configured in the parsing module 205, based on information on type and application software implementing the frontend infrastructure 102. In other embodiments, the parsing module 205 removes superfluous information by detecting and filtering core sensor readings, e.g., temperature, time, equipment 101 identifier, etc.

UI clients 114 can also be used to receive from the operator of the equipment 101, an operation profile of the equipment 101. The operation profile can include data, such as, device identifier of equipment 101, its location identifier, its brand, type, age, hours of operation, service and/or maintenance history, and a list of the physical parameters, which the system 100 can monitor. Sensor data in combination with the operation profiles of a multitude of equipment devices 101 across an industry can be used to generate insight into diagnostics, maintenance, and overall operation efficiency of the equipment devices 101.

Range/Threshold-Based Notification

In some embodiments, the operation profile of the equipment 101 can include one or more threshold or ranges in which the equipment 101 is deemed to function normally, and sensor readings outside those threshold and ranges can indicate an equipment failure or a need for repair. For example, the sensors 106 can be deployed in walk-in coolers where a temperature range of 35-41 degrees Fahrenheit would indicate normal operations and temperatures outside that range would indicate potential problem with the cooler. The operation profile of the equipment 101 received at the backend server 112 can include data indicating this range.

The sensors 106 can continuously or near-continuously monitor, poll or detect one or more physical parameters identified in the operation profile of the equipment 101 and can periodically transmit the sensor readings to gateway 108. The gateway 108 can receive and transmit the sensor reading data to the sensor-side server 110, as they are received or periodically at other predetermined intervals. The sensor-side server 110 can transmit the received sensor readings to the backend server 112.

The sensors 106 can be deployed in a plurality and at various locations and configuration with respect to equipment 101 in order to improve the overall accuracy of the system 100. For example, in the context of monitoring walk-in coolers, sensors 106 can be deployed in a variety of locations inside the walk-in cooler to provide a more thorough picture of the temperature inside the cooler. For example, some sensors 106 can be deployed near the door, some in the middle of the walk-in cooler and some deeper inside the walk-in cooler. The sensor-side server 110 and/or the backend server 112 can process the sensor data by assigning weights to each sensor data based on sensor's location. In the example of a walk-in cooler, the sensor readings 106 from near the door of the cooler can be given a weight less than the sensors deep inside the walk-in cooler, because temperatures near the door might typically be higher than the temperatures inside the walk-in cooler. Therefore, higher temperature readings of that sensor are not necessarily indicative of an equipment failure. The operation profile of the equipment 101 can include sensor weight preferences of the operator of the equipment 101.

In some embodiments, the backend server 112 can store a history of sensor readings and detect one or more patterns in the sensor readings. The patterns can indicate the weight each sensor reading should be given in determining whether a maintenance notification alert should be generated for the operator of the equipment 101. For example, if historically temperature sensor readings from a sensor 106 have been higher than other sensor 106 readings, without the equipment 101 having experienced a failure, that can indicate that the higher temperatures detected in the location of the high temperature sensor 106 are normal. Perhaps that sensor 106 may be located near the door of a walk-in cooler. As a result of detecting this historic pattern, the backend server 112 can reduce the weight given to the high-temperature sensor 106 in determining whether a maintenance alert should be generated for the equipment 106.

In other words, the backend server 112 can detect one or more patterns in a plurality of sensor readings from a plurality of sensors 106, wherein the patterns indicate normal or abnormal equipment operation based on the stored history of the sensor data. The same algorithm is applicable to other types of sensors 106 and equipment 101. For example, a vibration sensor 106 reporting historically high vibrations, relative to other vibration sensors 106 mounted on a manufacturing equipment 101, can indicate normal operations, if the manufacturing equipment 101 has not failed or reported a problem.

In some embodiments, the operation profile of the equipment 101 can include one or more instantaneous alert thresholds. While the frontend infrastructure 102 sends sensor readings intermittently or at pre-determined intervals to the backend infrastructure 104 (e.g., every 10 minutes or every 15 minutes), the sensors 106 can be configured to transmit some sensor readings instantly or near instantly. For example, an operation profile of a walk-in cooler can indicate that temperatures from any sensor 106 above an instantaneous alert threshold (e.g., above 55 degrees Fahrenheit) indicate an equipment failure. If sensors 106 detect temperatures above the instantaneous alert threshold, they wake up and transmit those temperatures instantly or near instantly, regardless of their normal transmission interval windows. Subsequently, the backend sever 112 can receive those sensor readings and generate an alert for the UI clients 114.

Pattern-Based Notifications

In some embodiments, the sensor readings might not exceed a threshold or be outside of a range indicated in the operation profile of equipment 101. However, patterns and history of sensor readings can indicate a trajectory and approach, wherein it can be likely that the equipment 101 might fail. For example, a vibration, current or temperature sensor 106 can report readings that are gradually increasing over a period of time and the trend in sensor reading indicates a near-future propensity to exceed a threshold or range indicated in the operation profile of the equipment 101. In other instances, the detected patterns can indicate an erratic range of values of the monitored parameters beyond the noise levels of the system 100. For example, a temperature sensor 106 whose reported temperatures have been constant or near constant can start oscillating between a high temperature value and the constant value in periodic or non-periodic manner. This can indicate an upcoming equipment failure. In other words, the present reported sensor values can be compared against stored sensor data of the same sensor to determine patterns indicating abnormal or near-future abnormal state. The backend server 112 can generate and transmit a repair notification to UI client 114 associated with the equipment 101.

Additionally, the repair notification can include a course of action determined based on the sensor readings, processed clean sensor data and detected patterns in sensor data. For example, the backend server 112 can detect a pattern of increasing temperatures in a sensor 106 located near the door of a walk-in cooler that persists throughout a 24-hour period. The door is expected to be shut for an extended period of time during night hours and the temperature readings near the door are expected to drop during those hours. Other temperature sensors 106 inside the walk-in cooler do not indicate the same pattern of rising temperature and at night drop and stay constant. In this scenario, the timing of sensor readings, the location of sensor readings, and the history of the sensor reading, can indicate a malfunction or broken seal in the door of the walk-in cooler. Consequently, the repair notification can include a course of action determined based on timing, location, involved parts, and corresponding solutions. For example, a notification generated on the UI client 114 can include text phrase, "high temperatures near cooler entrance during night. Inspect proper door operation and seal."

In some embodiments, the backend server 112 can detect patterns indicative of normal or abnormal equipment operation, not only from sensor data from an individual equipment 101, but from a collection of equipment 101, that may be present at the same site or at different locations. In other words, a plurality of same or similar equipment 101 can be included in the pattern detection of the backend server 112, for example, sensor data from equipment 101 having same brand and/or type can be included in pattern detection. In other examples, sensor data, as well as notification data, stored in the database 116 over a period of time can be used for pattern detection. Refrigerator XYZ brand of type UVW can show a pattern of needing a condenser part replacement after 10,000 hours of operations across various operators. Consequently, operators having the same or similar refrigerator can be sent a repair notification at or before their equipment reaches 10,000 hours of operation.

In another embodiment, the detected patterns in sensor data from one or more equipment 101 can be used to generate a set of conditions whose existence in another equipment 101 of same or similar type can indicate an anomaly. For example, when an increasing trend in temperature sensor readings for a first equipment 101 is detected, the backend server 112 can generate a set of conditions indicative of an anomaly, where the set of conditions are extracted from the first equipment 101. The set of conditions can include data, such as brand, type, age, constituent parts, duration of time after which a part required maintenance, or any other data correlated with the anomaly in the first equipment 101. In some embodiments, maintenance records of the first equipment 101 stored on database 116 and/or received via operation profile of the first equipment 101 can be used to further augment the set of conditions indicative of an anomaly. In some embodiments, the set of conditions indicative of an anomaly can be generated from a plurality of first equipment 101.

Next, the backend server 112 can scan the received sensor readings from a second equipment 101, and if presence of the set of conditions indicative of the anomaly is detected, the backend server 112 can generate a repair notification via UI clients 114. In some embodiments, the set of conditions can be used in a predictive manner, such that when presence of some of the set of conditions indicative of anomaly is detected, and one or more remaining conditions are going to be satisfied in the near future, the backend server 112, can issue a repair notification. For example, when brand and type of a second equipment 101 matches the brand and type in a set of condition indicative of anomaly, and the age of a part in the second equipment 101 is approaching an age indicated in the set of conditions within a predetermined threshold, the backend server 112 can generate a repair notification. The predetermined threshold can for example be encoded as within 90% of the value of a parameter in the set of conditions (e.g., hours of operation of the part).

Figure 3:
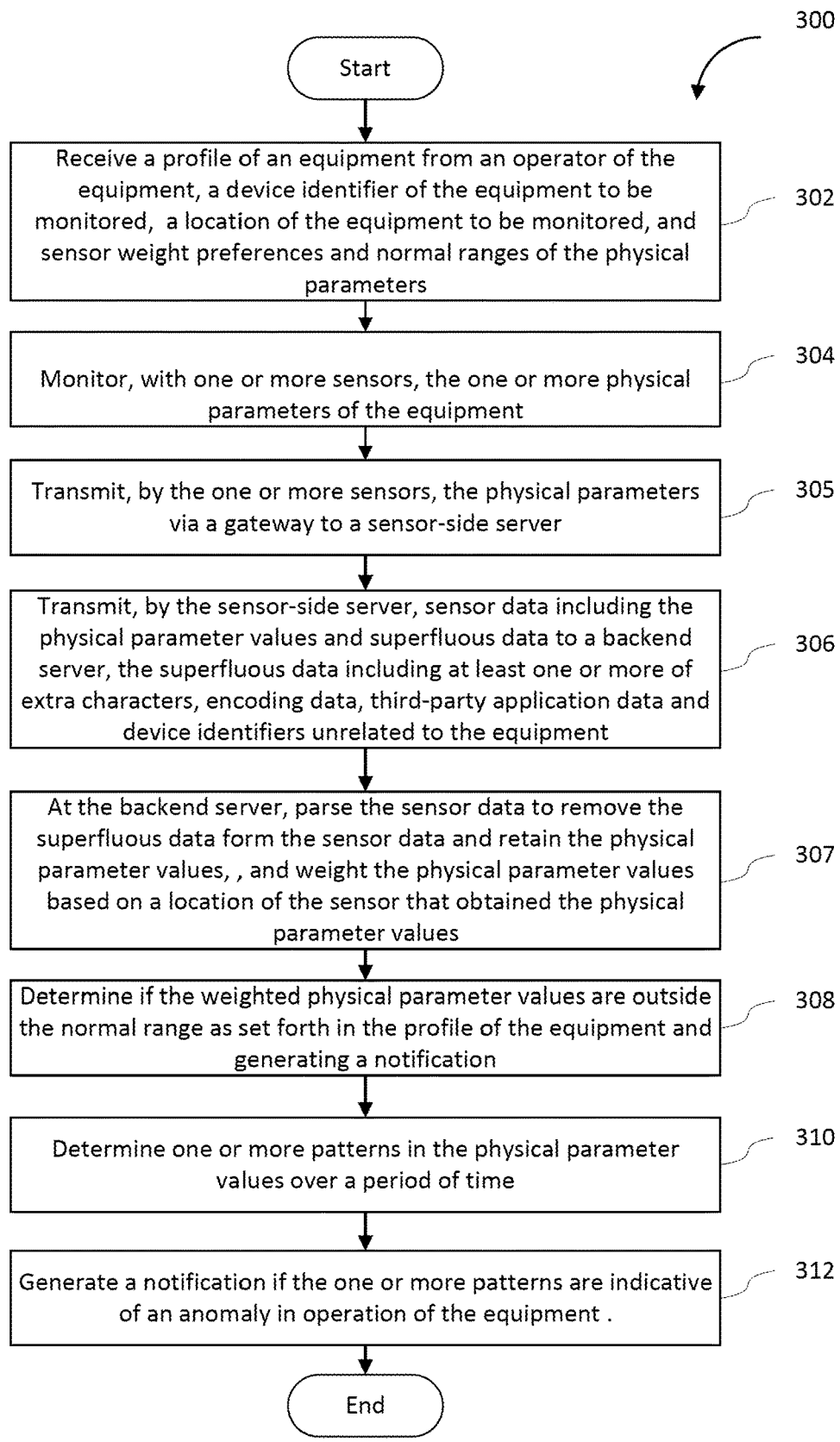
FIG. 3 illustrates a flowchart of a method of providing automated maintenance using the embodiment of FIGS. 1 and 2.

FIG. 3 illustrates a flow chart of a method 300 of providing automated maintenance using the systems 100 and 200. At step 302, the method includes receiving a profile of an equipment from an operator of the equipment, wherein the profile comprises one or more physical parameters of the equipment to be monitored and normal ranges of the physical parameters. At step 304, the method includes monitoring, with one or more sensors, the one or more physical parameters of the equipment. At step 306, the method includes transmitting the physical parameter values to a backend server. At step 308, the method includes determining if the physical parameter values are outside the normal range and generating a notification. At step 310, the method includes determining one or more patterns in the physical parameter values over a period of time. At step 312, the method includes generating a notification if the one or more patterns are indicative of an anomaly in operation of the equipment.

Figure 4:
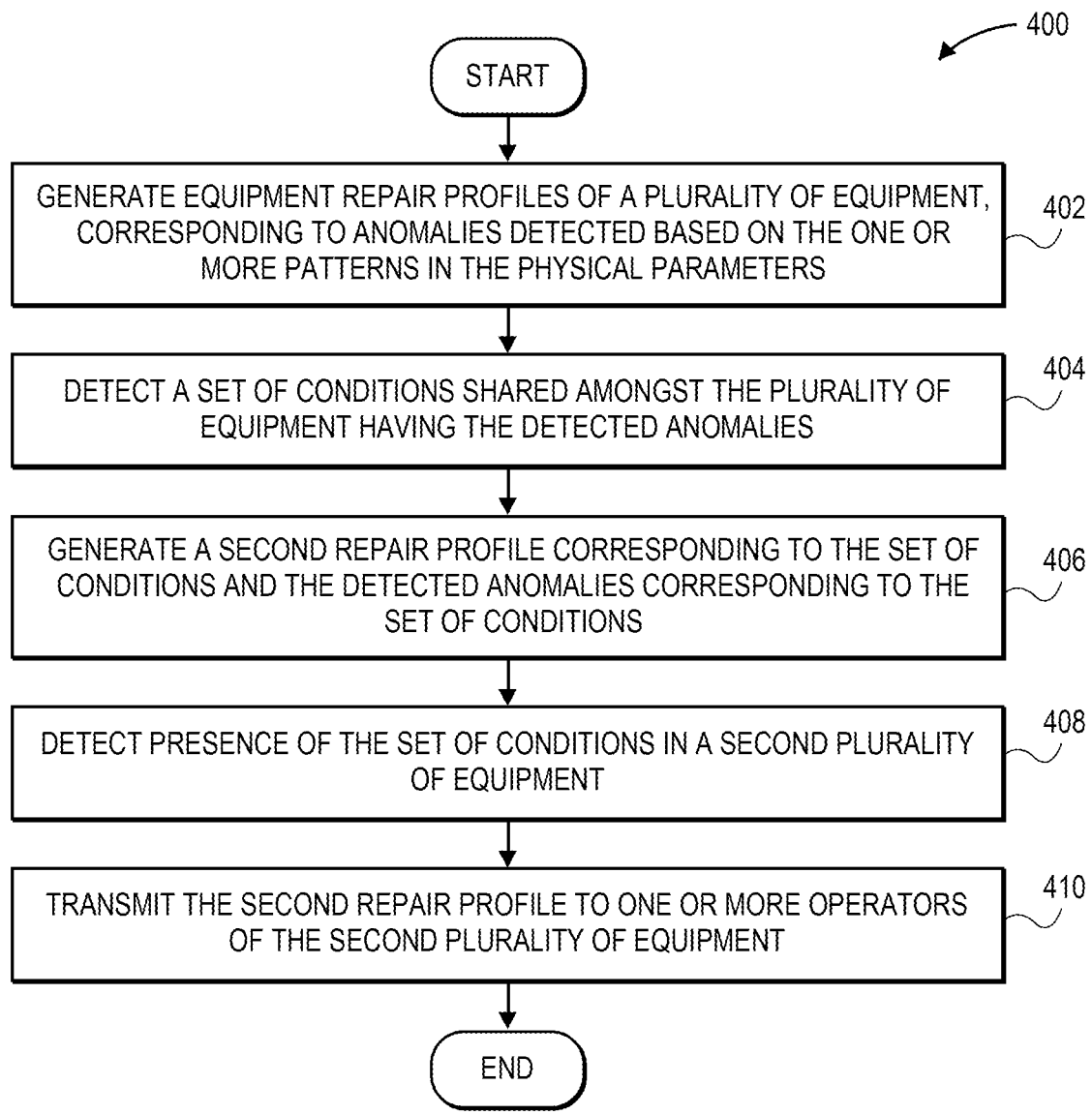
FIG. 4 illustrates a flowchart of a method, which can be used in combination with the embodiment of FIG. 3 to improve the operations of the embodiment of FIG. 1.

FIG. 4 illustrates a flowchart of a method 400, which can be used in combination with the embodiment of FIG. 3 to improve the operations of the system 100. At step 402, the method includes, generating equipment repair profiles of a plurality of equipment, corresponding to anomalies detected based on the one or more patterns in the physical parameters. At step 404, the method includes, detecting, based at least partly on the equipment repair profiles, a set of conditions shared amongst the plurality of equipment having the detected anomalies. At step 406, the method includes generating a second repair profile corresponding to the set of conditions and the detected anomalies corresponding to the set of conditions. At step 408, the method includes detecting presence of the set of conditions in a second plurality of equipment. At step 410, the method includes transmitting the second repair profile to one or more operators of the second plurality of equipment.

Artificial Intelligence (AI) Techniques of Detecting Patterns Indicating Device Failure In some embodiments, AI techniques can be used to detect primary or secondary patterns indicative of device or equipment failure. Primary patterns can refer to patterns existing in raw or clean sensor 106 data indicative of normal or abnormal device operation. Secondary patterns can refer to patterns existing in prior maintenance records of a plurality of equipment 101, which can be indicative of normal or abnormal device operations in same or similar equipment.

Figure 5:
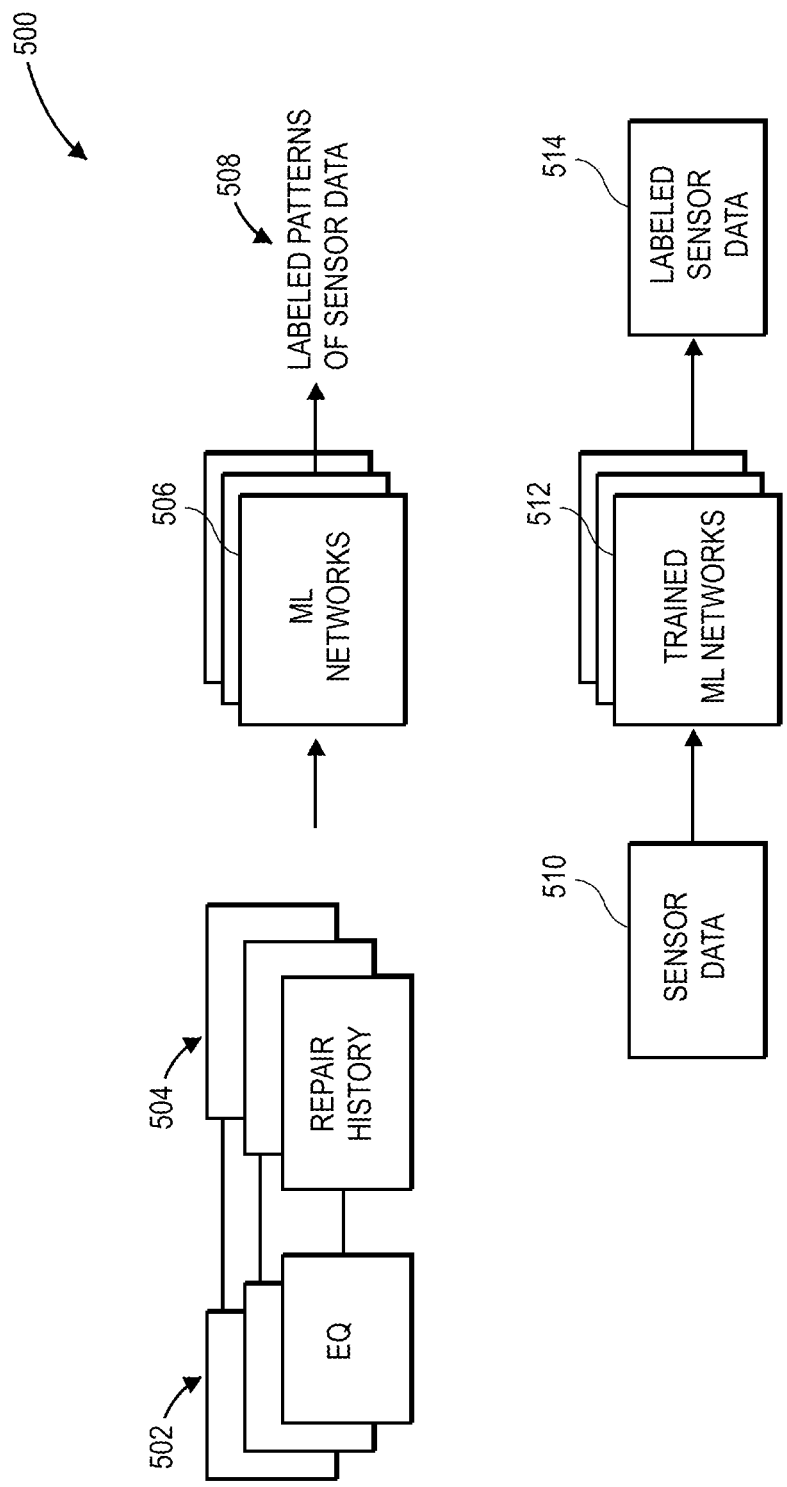
FIG. 5 illustrates a diagram of an artificial intelligence (AI) technique, which can be used for detecting primary or secondary patterns indicative of normal or abnormal equipment operation.

FIG. 5 illustrates a diagram 500 of an AI technique, which can be used for detecting primary or secondary patterns indicative of normal or abnormal device behavior. Sensor data of a first plurality of equipment 101 along with their prior repair history of the plurality of the equipment 101 can be used to train multiple machine learning (ML) networks 506 (e.g., neural networks or deep neural networks) to detect patterns of sensor data that can be correlated to normal or abnormal device operation. Each machine learning network 506 can be trained for detecting patterns of sensor data correlated with specific malfunctions in the first plurality of equipment 101. The past maintenance reports can be used as ground truth and used to train the ML networks 506. Multiple instances of the ML networks 506 can be trained for various brands, types of equipment 101 or different parts within the equipment 101. Furthermore, instances of the ML networks 506 can be trained to detect patterns of sensor data indicative of a malfunction, wherein each instance of ML network 506 is trained to detect patterns of sensor data correlated with a malfunction. After training, the ML networks 506 can detect patterns of sensor data correlated with one or more device malfunctions and can label the sensor data accordingly, thereby generating labeled patterns of sensor data 508. The sensor data for the purpose of training the ML networks 506 may be converted into various data structure formats, including, for example, vectors, arrays, multidimensional arrays, and/or tensors.

Next, sensor data 510 from a second plurality of equipment 101 whose maintenance needs or repair history may be unknown are received by one or more trained ML network 512. The ML networks 512 are the same or similar to the ML networks 506 after training. The trained ML networks 512 can detect patterns of sensor data 508 in the input sensor data 510 and label them accordingly. The labels can include information that correlate with maintenance requirements of the second plurality of equipment 101. For example, labels can include, "normal device operation," "abnormal device operation," "part failure imminent," or they can include part specific information, such "part MNPQ imminent failure," or any label that may improve diagnostics and maintenance of the second plurality of equipment 101. At the same time, the backend server maintains a mapping of which specific equipment 101, the sensor data containing a detected labeled pattern originate from (e.g, via a database entry mapping a device identifier with the stored sensor barcode or QR code). The backend server 112 can therefore identify to which equipment 101, the detected labeled pattern of sensor data corresponds.

Figure 6:
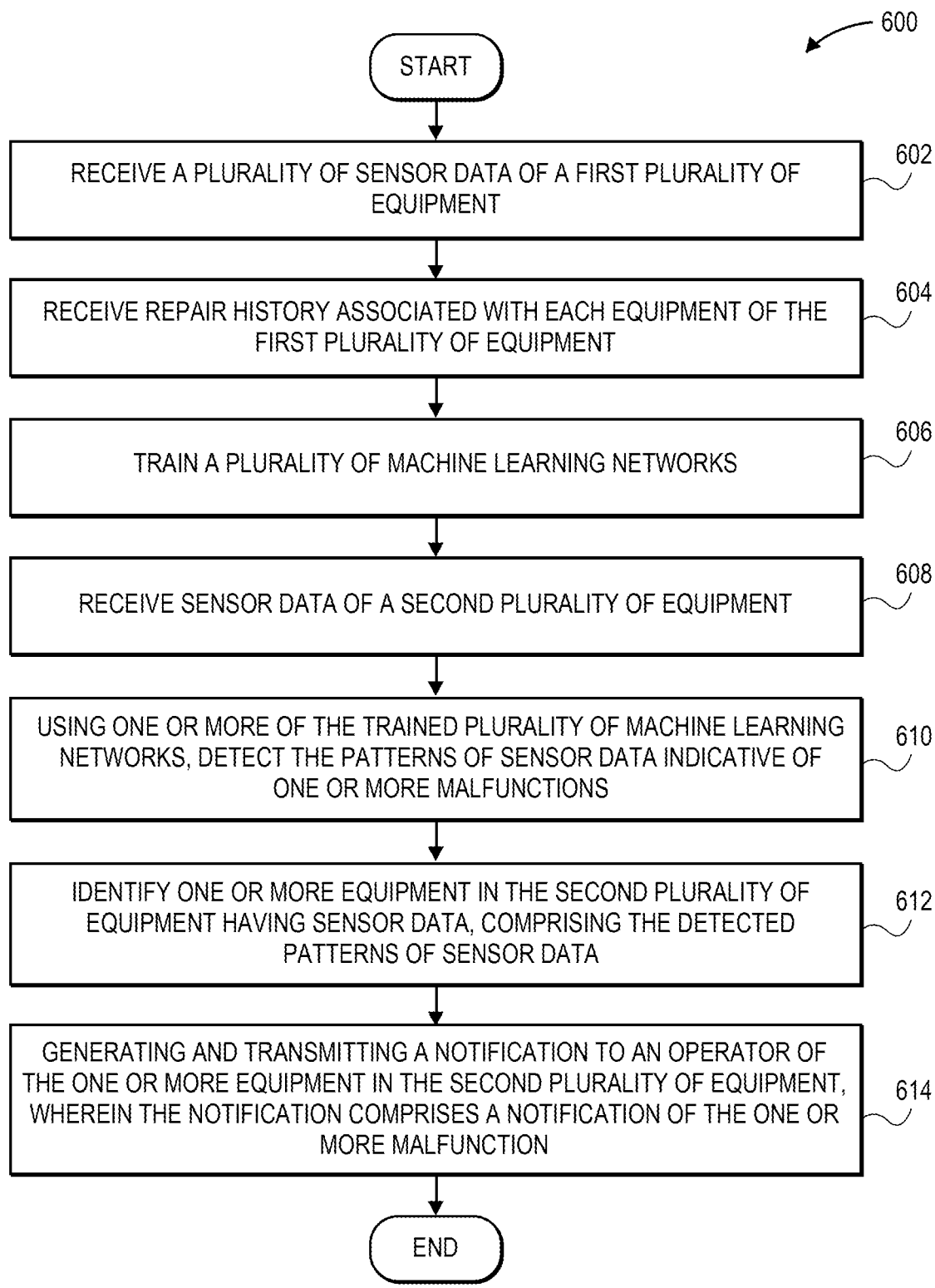
FIG. 6 illustrates a flowchart of a method of using artificial intelligence (AI) techniques for detecting patterns of sensor data indicative of device failure.

FIG. 6 illustrates a flowchart of a method 600 of using artificial intelligence (AI) techniques for detecting patterns of sensor data indicative of device failure. At step 602, the method includes receiving a plurality of sensor data of a first plurality of equipment. At step 604, the method includes receiving repair history associated with each equipment of the first plurality of equipment. At step 606, the method includes training a plurality of machine learning networks to detect patterns of sensor data indicative of a plurality of malfunctions, wherein each machine learning network is trained for detecting the patterns of sensor data indicative of a single malfunction. At step 608, the method includes receiving sensor data of a second plurality of equipment. At step 610, the method includes using one or more of the trained plurality of machine learning networks to detect the patterns of sensor data indicative of one or more malfunctions. At step 612, the method includes identifying one or more equipment in the second plurality of equipment having sensor data, comprising the detected patterns of sensor data. At step 614, the method includes, generating and transmitting a notification to an operator of the one or more equipment in the second plurality of equipment, wherein the notification comprises a notification of the one or more malfunction.

The described embodiments of the backend infrastructure can be implemented using a network of computers and processors, including for example, Amazon Web services (AWS). In one embodiment, the backend server 112 can be a Node.js server. In some embodiments, a computer storage medium can include instructions that when executed cause one or more computer processors to perform operations, including those described in methods and techniques outlined above.

What is claimed is:

1. A method comprising:
receiving a profile of an equipment from an operator of the equipment, wherein the profile comprises one or more physical parameters of the equipment to be monitored a device identifier of the equipment to be monitored, a location of the equipment to be monitored, sensor weight preferences and normal ranges of the physical parameters;
monitoring, with one or more sensors, the one or more physical parameters of the equipment;
transmitting, by the one or more sensors, the physical parameters via a gateway to a sensor-side server;
transmitting, by the sensor-side server, sensor data including the physical parameter values and superfluous data to a backend server, the superfluous data including at least one or more of extra characters, encoding data, third-party application data and device identifiers unrelated to the equipment;
at the backend server, parsing the sensor data to remove the superfluous data from the sensor data and retaining the physical parameter values;
weighting the physical parameter values based on a location of the sensor that obtained the physical parameter values;
determining if the weighted physical parameter values are outside the normal range as set forth in the profile of the equipment and generating a notification;
determining one or more patterns in the physical parameter values over a period of time; and
generating a notification if the one or more patterns are indicative of an anomaly in operation of the equipment.

2. The method of claim 1, wherein the one or more patterns indicative of an anomaly comprise the one or more parameter values approaching a range outside the normal range over a period of time, but not exceeding the normal range over the period of time.

3. The method of claim 1, wherein the one or more patterns indicative of an anomaly are determined via one or more machine learning algorithms based on monitored parameter values of a plurality of equipment over a period of time.

4. The method of claim 1 further comprising:
detecting one or more equipment-wide patterns indicative of anomaly in operation, the one or more equipment-wide patterns shared among a plurality of same or similar equipment; and
generating a notification for some or all of the same or similar equipment.

5. The method of claim 1 further comprising:
generating a set of conditions based at least partly on the one or more patterns, wherein the set of conditions correlate with the anomaly;
generating an equipment repair profile corresponding to the anomaly, along with a mapping of the equipment to the equipment repair profile;
detecting the presence of the set of conditions in a second equipment; and
transmitting the equipment repair profile to an operator of the second equipment.

6. The method of claim 5 further comprising transmitting the equipment repair profile to other operators having equipment same or similar to the second equipment.

7. The method of claim 1, further comprising:
generating equipment repair profiles of a plurality of equipment, corresponding to the anomaly detected based on the one or more patterns in the physical parameters;
based at least partly on the equipment repair profiles, detecting a set of conditions shared amongst the plurality of equipment having the detected anomaly;

generating a second repair profile corresponding to the set of conditions and the detected anomaly corresponding to the set of conditions;

detecting presence of the set of conditions in a second plurality of equipment; and transmitting the second repair profile to one or more operators of the second plurality of equipment.

8. The method of claim 7, wherein the set of conditions comprise one or more of; a brand of the equipment, or part identification of a previously repaired or replaced part, and a duration of time after which the part needed repair or replacement.

9. The method of claim 1, wherein the physical parameters comprise one or more of temperature, vibration, electrical current and power drawn.

10. The method of claim 1, further comprising: transmitting a sensor configuration signal from the backend server to the one or more sensors, wherein the sensor configuration signal is at least partly based on the equipment profile.

11. Non-transitory computer storage that stores executable program instructions that, when executed by one or more computing devices, configure the one or more computing devices to perform operations comprising:

receiving a profile of an equipment from an operator of the equipment, wherein the profile comprises one or more physical parameters of the equipment to be monitored, a device identifier of the equipment to be monitored, a location of the equipment to be monitored, sensor weight preferences and normal ranges of the physical parameters;

monitoring, with one or more sensors, the one or more physical parameters of the equipment;

transmitting, by the one or more sensors, the physical parameters via a gateway to a sensor-side server;

transmitting, by the sensor-side server, sensor data including the physical parameter values and superfluous data to a backend server, the superfluous data including at least one or more of extra characters, encoding data, third-party application data and device identifiers unrelated to the equipment;

at the backend server, parsing the sensor data to remove the superfluous data from the sensor data and retain the physical parameter values;

determining weighted physical parameter values by weighting the physical parameter values based on a location of the sensor that obtained the physical parameter values;

determining if the weighted physical parameter values are outside the normal range as set forth in the profile of the equipment and generating a notification;

determining one or more patterns in the physical parameter values over a period of time; and generating a notification if the one or more patterns are indicative of an anomaly in operation of the equipment.

12. The non-transitory storage of claim 11, wherein the one or more patterns indicative of an anomaly comprise the one or more parameter values approaching a range outside the normal range over a period of time, but not exceeding the normal range over the period of time.

13. The non-transitory storage of claim 11, wherein the one or more patterns indicative of an anomaly are determined via one or more machine learning algorithms based on monitored parameter values of a plurality of equipment over a period of time.

14. The non-transitory storage of claim 11, wherein the operations further comprise:

detecting one or more equipment-wide patterns indicative of anomaly in operation, the one or more equipment-wide patterns shared among a plurality of same or similar equipment; and generating a notification for some or all of the same or similar equipment.

15. The non-transitory storage of claim 11, wherein the operations further comprise:

generating a set of conditions based at least partly on the one or more patterns, wherein the set of conditions correlate with the anomaly;

generating an equipment repair profile corresponding to the anomaly, along with a mapping of the equipment to the equipment repair profile;

detecting the presence of the set of conditions in a second equipment; and transmitting the equipment repair profile to an operator of the second equipment.

16. The non-transitory storage of claim 15, wherein the operations further comprise: transmitting the equipment repair profile to other operators having equipment same or similar to the second equipment.

17. The non-transitory storage of claim 11, wherein the operations further comprise:

generating equipment repair profiles of a plurality of equipment, corresponding to the anomaly detected based on the one or more patterns in the physical parameters;

based at least partly on the equipment repair profiles, detecting a set of conditions shared amongst the plurality of equipment having the detected anomaly;

generating a second repair profile corresponding to the set of conditions and the detected anomaly corresponding to the set of conditions;

detecting presence of the set of conditions in a second plurality of equipment; and transmitting the second repair profile to one or more operators of the second plurality of equipment.

18. The non-transitory storage of claim 17, wherein the set of conditions comprise one or more of a brand of the equipment, or part identification of a previously repaired or replaced part, and a duration of time after which the part needed repair or replacement.

19. The non-transitory storage of claim 11, wherein the physical parameters comprise one or more of temperature, vibration, electrical current and power drawn.

20. The non-transitory storage of claim 11, wherein the operations further comprise: transmitting a sensor configuration signal from the backend server to the one or more sensors, wherein the sensor configuration signal is at least partly based on the equipment profile.

* * * * *